US012600891B2

(12) United States Patent
Abe et al.

(10) Patent No.: US 12,600,891 B2

(45) Date of Patent: Apr. 14, 2026

(54) URETHANE-BASED ADHESIVE COMPOSITION

(71) Applicant: SIKA TECHNOLOGY AG, Baar (CH)

(72) Inventors: Megumi Abe, Kanagawa (JP); Yuichi Matsuki, Kanagawa (JP); Kazuki Miura, Kanagawa (JP)

(73) Assignee: SIKA TECHNOLOGY AG, Baar (CH)

(*) Notice: Subject to any disclaimer, the term of this patent is extended or adjusted under 35 U.S.C. 154(b) by 484 days.

(21) Appl. No.: 18/251,332

(22) PCT Filed: Nov. 17, 2021

(86) PCT No.: PCT/JP2021/042262

§ 371 (c)(1),
(2) Date: May 1, 2023

(87) PCT Pub. No.: WO2022/107819

PCT Pub. Date: May 27, 2022

(65) Prior Publication Data

US 2024/0002710 A1 Jan. 4, 2024

(30) Foreign Application Priority Data

Nov. 18, 2020 (JP) ................................ 2020-191760

(51) Int. Cl.

*C09J 175/08* (2006.01)
*C08G 18/12* (2006.01)
*C08G 18/48* (2006.01)
*C08G 18/79* (2006.01)
*C08K 13/02* (2006.01)
*C09J 11/04* (2006.01)
*C09J 11/06* (2006.01)
*C08K 3/04* (2006.01)
*C08K 3/26* (2006.01)
*C08K 5/12* (2006.01)

(52) U.S. Cl.

CPC ............ *C09J 175/08* (2013.01); *C08G 18/12* (2013.01); *C08G 18/4866* (2013.01); *C08G 18/792* (2013.01); *C08K 13/02* (2013.01); *C09J 11/04* (2013.01); *C09J 11/06* (2013.01); *C08K 3/04* (2013.01); *C08K 2003/265* (2013.01); *C08K 5/12* (2013.01); *C08K 2201/014* (2013.01)

(58) Field of Classification Search

CPC ........ C08G 18/12; C08G 18/792; C09J 11/06; C09J 11/04; C09J 175/08

USPC .......................................................... 524/296

See application file for complete search history.

(56) References Cited

U.S. PATENT DOCUMENTS

2005/0192423 A1* 9/2005 Niesten ................ C08G 18/283 528/49
2011/0060101 A1 3/2011 Suau et al.
2011/0313053 A1 12/2011 Munzenberg et al.
2019/0136105 A1* 5/2019 Abe .................. C08G 18/3215
2022/0041908 A1 2/2022 Abe et al.

FOREIGN PATENT DOCUMENTS

CN 102167790 A 8/2011
WO WO 2020/158289 A1 8/2020

* cited by examiner

*Primary Examiner* — Ruiyun Zhang

(74) *Attorney, Agent, or Firm* — OLIFF PLC

(57) ABSTRACT

A urethane adhesive composition contains a urethane prepolymer (A) having an isocyanate group at its terminal, and a compound (B) represented by Formula (1), where R represents a hydrogen atom or an alkyl group, and n represents an integer of 6 or more.

(1)

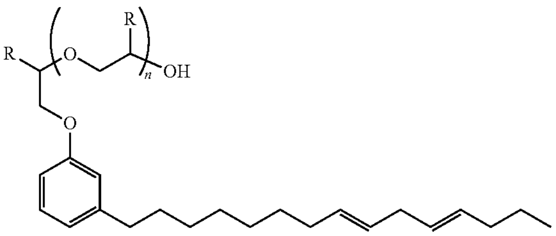

12 Claims, No Drawings

URETHANE-BASED ADHESIVE COMPOSITION

TECHNICAL FIELD

The present technology relates to a urethane adhesive composition.

BACKGROUND ART

Conventionally, urethane adhesive compositions have been proposed for a sealing agent, an adhesive and the like used for automobiles, construction, and structures (International Patent Publication No. WO 2020/158289, for example).

Recently, while improved performance and safety have been demanded in various fields, with regard to a urethane adhesive composition to be used, there is also a demand for an improvement in physical properties of rubber having been cured (hereinafter, simply referred to as "rubber physical properties"). In particular, improvements in strength (breaking strength) and elongation (breaking elongation) after curing are demanded. It is also desired to exhibit excellent rubber physical properties after exposure to a high temperature environment.

Under the circumstances, the inventors of the present technology prepared a urethane adhesive composition in reference to International Patent Publication No. WO 2020/158289 and studied the rubber physical properties of the composition. As a result, it was found that further improvements are required in consideration of higher demands to be probably required in future.

SUMMARY OF TECHNOLOGY

The technology provides a urethane adhesive composition exhibiting excellent rubber physical properties.

The inventors of the technology have made an intensive study and found that the foregoing problem can be solved by adding a specific cardanol alkylene oxide additive, and the technology has been thus made.

That is, the inventors of the technology found that the foregoing problem can be solved by the following constitution.

[1] A urethane adhesive composition comprising a urethane prepolymer (A) having an isocyanate group at its terminal, and a compound (B) represented by Formula (1) to be described later.

[2] The urethane adhesive composition according to [1], wherein a content of the compound (B) is 0.01 to 10 mass % based on a total mass of the urethane adhesive composition.

[3] The urethane adhesive composition according to [1] or [2], wherein the urethane prepolymer (A) is a urethane prepolymer obtained by mixing a polyether polyol with a number average molecular weight of 500 to 20,000 and an aromatic polyisocyanate such that a ratio of isocyanate groups in the aromatic polyisocyanate to one mole of hydroxyl groups in the polyether polyol is 1.5 to 2.5 moles and reacting them with each other.

[4] The urethane adhesive composition according to any one of [1] to [3], further comprising a carbon black or a calcium carbonate.

[5] The urethane adhesive composition according to any one of [1] to [4], further comprising a modified isocyanate.

As described below, according to the technology, it is possible to provide a urethane adhesive composition exhibiting excellent rubber physical properties.

DETAILED DESCRIPTION

Below, the urethane adhesive composition according to the technology is described.

In the present description, a numerical range expressed in the form of "A to B" is intended to mean the range including the values A and B before and after "to" as the lower limit value and the upper limit value.

For each component contained in the urethane adhesive composition according to the technology, a single substance may be used alone or two or more substances may be used in combination. In a case where two or more substances are used in combination for a certain component, the component content means a total content thereof unless otherwise noted.

In addition, excellent adhesion and excellent physical properties (strength, elongation, and hardness) of rubber having been cured are also described as "excellent effect or the like of the technology."

In addition, "after exposure to a high temperature environment" (for instance, after being left to stand in a 90° C. environment for two weeks) is also called "after exposure to heat."

The urethane adhesive composition of the technology (hereinafter, also called "composition of the technology)" is a urethane adhesive composition containing a urethane prepolymer (A) having an isocyanate group at its terminal, and a compound (B) represented by Formula (1) to be described later.

Presumably because the composition of the technology has the constitution as described above, the foregoing problem of the technology is solved. The reason therefor is not clear, and it is assumed that the elongation is large because the crosslinking density is slightly lowered as a result of a reaction between an OH group of the compound (B) and an isocyanate group of the urethane prepolymer.

While the composition of the technology may be either a one-part urethane adhesive composition which contains no curing agent or a two-part urethane adhesive composition which comprises a main agent containing the urethane prepolymer (A) and a curing agent, a two-part urethane adhesive composition is preferred because the effect or the like of the technology is more excellent. In a case where the composition of the technology is a two-part urethane adhesive composition, while the compound (B) may be contained in either the main agent or the curing agent, the main agent preferably contains the compound (B) because the effect or the like of the technology is more excellent.

[Urethane Prepolymer (A)]

The urethane prepolymer (A) is a urethane prepolymer having an isocyanate group at a terminal thereof.

In a preferred embodiment, the urethane prepolymer (A) is a urethane prepolymer having two or more isocyanate groups at its terminals per molecule.

A conventionally known urethane prepolymer may be used as the urethane prepolymer (A).

The urethane prepolymer (A) is preferably a urethane prepolymer obtained by reacting a polyisocyanate with a compound having two or more active hydrogen-containing groups per molecule (hereinafter, also called "active hydrogen compound") such that isocyanate groups are excessive with respect to the active hydrogen-containing groups, because the effect or the like of the technology is more excellent.

In the technology, an active hydrogen-containing group means a group containing active hydrogen. Examples of the active hydrogen-containing group include a hydroxy group, an amino group, and an imino group.

[Polyisocyanate]

The polyisocyanate used in production of the urethane prepolymer (A) is not particularly limited as long as it has two or more isocyanate groups per molecule.

Examples of the polyisocyanate include an aromatic polyisocyanate such as tolylene diisoyanate (TDI, e.g., 2,4-tolylene diisocyanate, and 2,6-tolylene diisocyanate), diphenylmethane diisocyanate (MDI, e.g., 4,4'-diphenylmethane diisocyanate, and 2,4'-diphenylmethane diisocyanate), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), or triphenylmethane triisocyanate; an aliphatic and/or alicyclic polyisocyanate such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatomethyl)cyclohexane (H6XDI), or dicyclohexylmethane diisocyanate (H12MDI); a carbodiimide-modified polyisocyanate thereof, an isocyanurate-modified polyisocyanate thereof and an allophanate-modified product thereof.

The polyisocyanate is preferably an aromatic polyisocyanate and more preferably MDI because the effect or the like of the technology is more excellent.

Polyisocyanates may be used alone or in combination of two or more thereof.

<Active Hydrogen Compound>

The compound having two or more active hydrogen-containing groups per molecule (active hydrogen compound) to be used in production of the urethane prepolymer (A) is not particularly limited. Examples of the active hydrogen-containing group include a hydroxyl (OH) group, an amino group, and an imino group.

Preferred examples of the active hydrogen compound include a polyol having two or more hydroxyl (OH) groups per molecule, and a polyamine compound having two or more amino groups and/or two or more imino groups per molecule. Of these, a polyol is preferred.

The above polyol is not particularly limited as long as it is a compound having two or more OH groups. Specific examples of the polyol include polyether polyol; polyester polyol; (meth)acrylic polyol; polybutadiene polyol; hydrogenated polybutadiene polyol; low-molecular polyhydric alcohols; and mixed polyols thereof. Of these, polyether polyol may be a preferred embodiment because the effect or the like of the technology is more excellent.

The polyether polyol is not particularly limited as long as it is a compound having polyether as the main chain and two or more hydroxy groups. Polyether is a group having two or more ether bonds, and a specific example thereof is, for instance, a group having two or more structural units of —$R^a$—O—$R^b$— in total. In the foregoing structural unit, $R^a$ and $R^b$ each independently represent a hydrocarbon group. The hydrocarbon group is not particularly limited. An example thereof is a linear alkylene group with 1 to 10 carbon atoms.

Examples of the polyether polyol include polyoxyethylene diol (polyethylene glycol), polyoxypropylene diol (polypropylene glycol: PPG), polyoxypropylene triol, polyol of ethylene oxide/propylene oxide copolymer, polytetramethylene-ether glycol (PTMEG), polytetraethylene glycol, and sorbitol-based polyol.

Preferred polyether polyols include polypropylene glycol and polyoxypropylene triol from the viewpoint of excellent compatibility with polyisocyanate.

The number average molecular weight (Mw) of the polyether polyol is preferably 500 to 20,000 because the effect or the like of the technology is more excellent.

In the present description, the number average molecular weight of polyol is a value obtained from the hydroxyl value and the average number of functional groups, i.e., specifically calculated as (56,100/hydroxyl value)×average number of functional groups.

The hydroxyl value herein is a hydroxyl value described in JIS (Japanese Industrial Standard) K 1557-1: 2007 and is the number of milligrams of potassium hydroxide equivalent to the content of hydroxyl groups in one gram of a sample. The average number of functional groups is an average number of hydroxyl groups contained in one polyol molecule.

Active hydrogen compounds may be used alone or in combination of two or more thereof.

Preferred Embodiment

The urethane prepolymer (A) is preferably a urethane prepolymer obtained by reacting a polyether polyol with an aromatic polyisocyanate because the effect or the like of the technology is more excellent.

In a case where the urethane prepolymer (A) is a urethane prepolymer obtained by reacting a polyisocyanate with a polyol, the molar ratio (NCO/OH) of isocyanate groups in the polyisocyanate to hydroxyl groups in the polyol is preferably 1.5 to 2.5 because the effect or the like of the technology is more excellent.

The urethane prepolymer (A) is preferably a urethane prepolymer obtained by mixing a polyether polyol with the number average molecular weight of 500 to 20,000 and an aromatic polyisocyanate such that the ratio of isocyanate groups in the aromatic polyisocyanate to one mole of hydroxyl groups in the polyether polyol is 1.5 to 2.5 moles (i.e., NCO/OH=1.5 to 2.5) and reacting them with each other.

[Content]

The urethane prepolymer (A) content in the composition of the technology is preferably 10 to 95 mass % and more preferably to 60 mass % based on the total mass of the composition because the effect or the like of the technology is more excellent.

[Compound (B)]

The compound (B) is a compound represented by Formula (1) below.

(1)

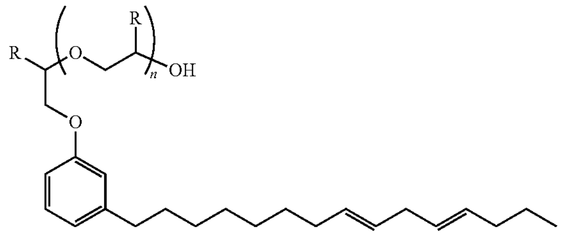

In Formula (1), R represents a hydrogen atom or an alkyl group, and n represents an integer of 6 or more.

R is preferably a hydrogen atom because the effect or the like of the technology is more excellent.

In a case where R is an alkyl group, R is preferably an alkyl group with 1 to 6 carbon atoms, more preferably an alkyl group with 1 to 3 carbon atoms, and yet more preferably a methyl group because the effect or the like of the technology is more excellent.

Because the effect or the like of the technology is more excellent, n is preferably an integer of 6 to 20, more preferably an integer of 8 to 18, and yet more preferably an integer of 10 to 16.

[Synthesis Method]

The synthesis method of the compound (B) is not particularly limited, and an example thereof is a method in which ethylene oxide is reacted with cardanol.

Exemplary products of the compound (B) include GX-5170, GX-5167, and GX-5166 manufactured by Cardolite Corporation.

[Content]

The compound (B) content in the composition of the technology is not particularly limited and is preferably 0.01 to mass % and more preferably 0.1 to 1 mass % based on the total mass of the composition because the effect or the like of the technology is more excellent.

In addition, the compound (B) content based on the foregoing urethane prepolymer (A) content is preferably 0.01 to mass %, more preferably 0.1 to 10 mass %, and yet more preferably 0.2 to 1 mass % because the effect or the like of the technology is more excellent.

In addition, the compound (B) content based on the modified isocyanurate to be described later is preferably 1 to 1,000 mass %, more preferably 2 to 100 mass %, yet more preferably 3 to mass %, and particularly preferably 10 to 20 mass % because the effect or the like of the technology is more excellent.

[Curing Agent]

As described above, the composition of the technology is preferably a two-part urethane adhesive composition comprising a main agent containing the urethane prepolymer (A) and a curing agent because the effect or the like of the technology is more excellent.

The curing agent contains a compound having two or more active hydrogen-containing groups per molecule (active hydrogen compound). Specific examples of the active hydrogen compound and the preferred embodiment thereof are the same as those of the active hydrogen compound described above.

[Content]

In the composition of the technology, the active hydrogen-containing group content of the active hydrogen compound in the curing agent is preferably 1 to 100 mol % and more preferably 5 to 50 mol % based on the isocyanate group content of the foregoing urethane prepolymer (A) because the effect or the like of the technology is more excellent.

[Mixing Ratio]

In a case where the composition of the technology is a two-part urethane adhesive composition, the mass ratio (curing agent/main agent) of the curing agent to the main agent is preferably 0.01 to 1 and more preferably 0.05 to 0.2 because the effect or the like of the technology is more excellent.

In addition, the mass ratio of the active hydrogen compound in the curing agent to the urethane prepolymer (A) is preferably to 1 and more preferably 0.05 to 0.2 because the effect or the like of the technology is more excellent.

[Other Components]

The composition of the technology may contain components other than the foregoing components.

In a case of a two-part urethane adhesive composition, it is possible to appropriately select which of the main agent and the curing agent other components are added to.

As the other components described above, for example, a filler (e.g., carbon black, and calcium carbonate), a modified isocyanate (e.g., isocyanurate, allophanate, and biuret), a catalyst (curing catalyst), a plasticizer, an antiaging agent, an antioxidant, a silane coupling agent, a pigment (dye), an adhesion promoter, a terpene compound such as terpineol, a thixotropy-imparting agent, an ultraviolet absorber, a flame retardant, a surfactant (including leveling agent), a dispersant, an hydrating agent, an antistatic agent, and other various additives and the like may be contained.

The above-described filler may be surface treated with, for example, at least one treatment agent selected from the group consisting of a fatty acid, a resin acid, a urethane compound, and a fatty acid ester.

In a case where the composition of the technology is a two-part urethane adhesive composition, it is possible to appropriately select which of the main agent and the curing agent the above-described optional component is added to.

The composition of the technology preferably contains no terpene compound because the effect or the like of the technology is more excellent.

[Modified Isocyanate]

The composition of the technology preferably contains a modified isocyanate because the effect or the like of the technology is more excellent.

The modified isocyanate preferably contains at least one selected from the group consisting of isocyanurate (nurate) of isocyanate, allophanate of isocyanate, and biuret of isocyanate, and more preferably contains isocyanurate (nurate) of isocyanate because the effect or the like of the technology is more excellent.

Specific examples of the isocyanate constituting the modified isocyanate are the same as those of polyisocyanate described above.

The isocyanate constituting the modified isocyanate is preferably aliphatic isocyanate and more preferably HDI because the effect or the like of the technology is more excellent.

<Content>

The modified isocyanate content in the composition of the technology is not particularly limited and is preferably 0.1 to mass % and more preferably 0.5 to 5 mass % based on the total mass of the composition because the effect or the like of the technology is more excellent.

The modified isocyanate content in the composition of the technology is not particularly limited and is preferably 1 to 20 mass % and more preferably 2 to 10 mass % based on the foregoing urethane prepolymer (A) content because the effect or the like of the technology is more excellent.

[Silane Coupling Agent]

The composition of the technology preferably contains a silane coupling agent because the effect or the like of the technology is more excellent.

<Content>

The silane coupling agent content in the composition of the technology is not particularly limited and is preferably 0.01 to mass % and more preferably 0.1 to 5 mass % based on the foregoing urethane prepolymer (A) content because the effect or the like of the technology is more excellent.

[Carbon Black]

The composition of the technology preferably contains carbon black because the effect or the like of the technology is more excellent.

The carbon black is not particularly limited. Examples thereof include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), and Medium Thermal (MT).

Specifically, for example, the SAF is exemplified by SEAST 9 (manufactured by Tokai Carbon Co., Ltd.), the ISAF by Showa Black N220 (manufactured by Showa Cabot K.K.), the HAF by SEAST 3 (manufactured by Tokai Carbon Co., Ltd.) and Niteron #200 (manufactured by Shin-Nikka Carbon), and the FEF by HTC #100 (manufactured by Chubu Carbon). Further, the GPF is exemplified by Asahi #55 (manufactured by ASAHI CARBON CO., LTD.) and SEAST 5 (manufactured by Tokai Carbon Co., Ltd.), the SRF by Asahi #50 (manufactured by ASAHI CARBON CO., LTD.) and Mitsubishi #5 (manufactured by Mitsubishi Chemical Corporation), the FT by Asahi Thermal (manufactured by ASAHI CARBON CO., LTD.) and HTC #20 (manufactured by Chubu Carbon), and the MT by Asahi #15 (manufactured by ASAHI CARBON CO., LTD.).

<Content>

The carbon black content in the composition of the technology is not particularly limited and is preferably 30 to mass % and more preferably 40 to 60 mass % based on the foregoing urethane prepolymer (A) content because the effect or the like of the technology is more excellent.

[Calcium Carbonate]

The composition of the technology preferably contains calcium carbonate because the effect or the like of the technology is more excellent.

The calcium carbonate is not particularly limited. Examples thereof include heavy calcium carbonate, precipitated calcium carbonate (light calcium carbonate), and colloidal calcium carbonate.

<Content>

The calcium carbonate content in the composition of the technology is not particularly limited and is preferably 20 to 150 mass %, more preferably 20 to 120 mass %, and yet more preferably 30 to 70 mass % based on the foregoing urethane prepolymer (A) content because the effect or the like of the technology is more excellent.

[Plasticizer]

The composition of the technology preferably contains a plasticizer because the effect or the like of the technology is more excellent.

Specific examples of the plasticizer include diisononyl phthalate (DINP); dioctyl adipate, isodecyl succinate; diethylene glycol dibenzoate, pentaerythritol ester; butyl oleate, methyl acetyl ricinolate; tricresyl phosphate, trioctyl phosphate; adipic acid-propylene glycol polyester, and adipic acid-butylene glycol polyester, and these may be used singly or in combination of two or more thereof.

<Content>

The plasticizer content in the composition of the technology is not particularly limited and is preferably 1 to 50 mass % and more preferably 5 to 40 mass % based on the foregoing urethane prepolymer (A) content because the effect or the like of the technology is more excellent.

[Catalyst (Curing Catalyst)]

The composition of the technology preferably contains a curing catalyst because the effect or the like of the technology is more excellent.

The curing catalyst is not particularly limited, and specific examples thereof include 2-ethylhexanoic acid, oleate, and other calboxylic acids; polyphosphate, ethyl acid phosphate, butyl acid phosphate, and other phosphates; bismuth octylate and other bismuth catalysts; dibutyltin dilaurate, dioctyltin dilaurate, and other tin catalysts; 1,4-diazobicyclo[2,2,2]octane, 2,4,6-tris(dimethylaminomethyl)phenol (e.g., DMP-30), a compound having a dimorpholinodiethyl ether structure, and other tertiary amine catalysts.

The curing catalyst preferably includes a dimorpholinodiethyl ether structure in terms of excellent adhesion.

The dimorpholinodiethyl ether structure is a structure having dimorpholinodiethyl ether as the basic structure.

In the dimorpholinodiethyl ether structure, a hydrogen atom included in a morpholine ring may be substituted by a substituent. The substituent is not particularly limited. Examples thereof include an alkyl group. The alkyl group may be exemplified by, for example, a methyl group and an ethyl group.

The curing catalysts may be used singly or in combination of two or more thereof.

<Content>

The curing catalyst content in the composition of the technology is not particularly limited and is preferably 0.05 to 2.0 mass % and more preferably 0.1 to 0.5 mass % based on the foregoing urethane prepolymer (A) content because the effect or the like of the technology is more excellent.

[Manufacturing Method]

When the composition of the technology is a one-part composition, the manufacturing method thereof is not particularly limited, and the composition can be manufactured by, for example, a method in which the urethane prepolymer (A), the compound (B), and other components selected as necessary are mixed.

When the composition of the technology is a two-part composition, the manufacturing method thereof is not particularly limited, and the composition can be manufactured by, for example, a method in which the above-described main agent and the above-described curing agent are separately introduced into different containers and are stirred in a nitrogen gas atmosphere in the containers.

To use the two-part composition, the main agent and the curing agent are mixed and used.

[Base Material]

Examples of the base material to which the composition of the technology can be applied include plastic, glass, rubber, and metal.

A preferred example of the base material is one containing an olefin resin.

The base material containing an olefin resin may be a base material obtained from a mixture of an olefin resin and a filler such as carbon fiber, glass as glass filler, talc, calcium carbon, or alumina.

Plastic may be, for example, homopolymer, copolymer, or a hydrogenated product. The same holds true for rubber.

Specific examples of plastic include: an olefin resin such as polypropylene, polyethylene, ethylene propylene copolymer, cycloolefin polymer (COP), or cycloolefin copolymer (COC); a polyester resin such as polyethylene terephthalate (PET) or polybutylene terephthalate (PBT); polymethyl methacrylate resin (PMMA resin); polycarbonate resin; polystyrene resin; acrylonitrile-styrene copolymer resin; polyvinyl chloride resin; acetate resin; acrylonitrile butadiene styrene resin (ABS resin); and polyamide resin.

The above-described COC means a cycloolefin copolymer such as a copolymer of tetracyclododecene and ethylene or another olefin.

The above-described COP means a cycloolefin polymer such as a polymer obtained by subjecting a norbornene to ring-opening polymerization and hydrogenating the resultant.

Plastic may be a poor adhesive resin.

The base material may be surface treated. Examples of surface treatment include flame treatment, corona treatment, and ITRO treatment. The surface treatment method is not particularly limited. A conventionally known method may be one example.

The method of applying the composition of the technology to the base material is not particularly limited. A conventionally known method may be one example.

With use of the composition of the technology, the effect of the technology can be exhibited at a high level without using a primer to the base material.

The composition of the technology can be cured by moisture or the like. For instance, the composition of the technology can be cured under the conditions of temperature of 5 to 90° C. and relative humidity (RH) of 5 to 95%.

[Applications]

The composition of the technology is useful as, for example, a sealing agent and an adhesive for automobiles, construction, and structures.

EXAMPLES

The technology is described below in further detail by way of examples. However, the technology should not be construed as being limited to the following examples.

[Preparation of Urethane Adhesive Composition]

Each two-part urethane adhesive composition (main agent, curing agent) was prepared by mixing the respective components shown in Table 1 below at the ratios (parts by mass) shown in the table.

[Evaluation]

The main agent and the curing agent of the obtained urethane adhesive composition were mixed at the ratio shown in the row of mixing ratios in Table 1 and left to stand in an environment of temperature of 23° C. and 50% RH for three days for curing. Of the cured product thus obtained, (initial) strength, elongation, and hardness were measured as described below. In addition, the obtained cured product was left to stand in an environment of temperature of 90° C. for two weeks, and then strength, elongation, and hardness thereof (after exposure to heat) were similarly measured. The results are shown in Table 1 below.

For practical use, the initial strength and the initial elongation are preferably not lower than 6.0 MPa and not less than 300%, respectively, while the strength after being left to stand in an environment of temperature of 90° C. for two weeks and the elongation after being left to stand in the same environment for the same period are preferably not lower than 5.5 MPa and not less than 200%, respectively.

[Strength, Elongation]

The tensile test (at a tension rate of 50 mm/min., in an environment of 20° C. and 50% RH) was conducted according to JIS K6850: 1999, and the strength (breaking strength) [MPa] and the elongation (breaking elongation) (%) were measured.

[Hardness]

According to the durometer hardness test method described in JIS K6253, hardness was measured in an environment of temperature of 20° C. and 55% RH using a type A durometer.

TABLE 1

| | | | | CE1 | CE2 | CE3 |
|---|---|---|---|---|---|---|
| Main Agent | A | Urethane prepolymer | | 42.4 | 42.4 | 42.1 |
| | B | GX-5170 | cardanol 12EO | | | |
| | | GX-5167 | cardanol 9EO | | | |
| | | GX-5166 | cardanol 7EO | | | |
| | | Isocyanurate | HDI nurate: D-170N | | 2.0 | |
| | | LITE 2020 | 1 EO | | | 0.3 |
| | | Carbon black | # 200MP | 20.7 | 20.0 | 20.7 |
| | | Calcium carbonate | Super S | 19.3 | 18.6 | 19.3 |
| | | Plasticizer | DINP | 17.4 | 16.8 | 17.4 |
| | | Catalyst | DMDEE | 0.2 | 0.2 | 0.2 |
| | | Total | | 100.0 | 100.0 | 100.0 |
| Curing Agent | | Polyol 1 | EXCENOL 450ED | 47.9 | 47.9 | 47.9 |
| | | Polyol 2 | PREMINOL 7001K | 5.0 | 5.0 | 5.0 |
| | | Calcium carbonate | KALFAIN 200 | 46.8 | 46.8 | 46.8 |
| | | Catalyst | U-810 | 0.3 | 0.3 | 0.3 |
| | | Total | | 100.0 | 100.0 | 100.0 |
| | Mixing ratio (mass ratio) Main agent/curing agent | | | 10/1 | 10/1 | 10/1 |
| Evaluation | Rubber physical properties | Initial | Strength [Mpa] | 5.24 | 7.02 | 5.50 |
| | | | Elongation [%] | 500 | 180 | 480 |
| | | | Hardness JIS-A | 47 | 55 | 46 |
| | | After exposure to heat 90° C. × 2 W | Strength [Mpa] | 4.94 | 7.31 | 5.04 |
| | | | Elongation [%] | 470 | 150 | 430 |
| | | | Hardness JIS-A | 46 | 57 | 45 |

| | | | | EX1 | EX2 | EX3 | EX4 |
|---|---|---|---|---|---|---|---|
| Main Agent | A | Urethane prepolymer | | 42.1 | 42.1 | 42.1 | 42.1 |
| | B | GX-5170 | cardanol 12EO | 0.3 | 0.3 | | |
| | | GX-5167 | cardanol 9EO | | | 0.3 | |
| | | GX-5166 | cardanol 7EO | | | | 0.3 |
| | | Isocyanurate | HDI nurate: D-170N | | 2.0 | 2.0 | 2.0 |
| | | LITE 2020 | 1 EO | | | | |
| | | Carbon black | # 200MP | 20.7 | 20.0 | 20.0 | 20.0 |

TABLE 1-continued

| | | | | | | | |
|---|---|---|---|---|---|---|---|
| | | Calcium carbonate | Super S | 19.3 | 18.6 | 18.6 | 18.6 |
| | | Plasticizer | DINP | 17.4 | 16.8 | 16.8 | 16.8 |
| | | Catalyst | DMDEE | 0.2 | 0.2 | 0.2 | 0.2 |
| | | Total | | 100.0 | 100.0 | 100.0 | 100.0 |
| Curing Agent | | Polyol 1 | EXCENOL 450ED | 47.9 | 47.9 | 47.9 | 47.9 |
| | | Polyol 2 | PREMINOL 7001K | 5.0 | 5.0 | 5.0 | 5.0 |
| | | Calcium carbonate | KALFAIN 200 | 46.8 | 46.8 | 46.8 | 46.8 |
| | | Catalyst | U-810 | 0.3 | 0.3 | 0.3 | 0.3 |
| | | Total | | 100.0 | 100.0 | 100.0 | 100.0 |
| Mixing ratio (mass ratio) Main agent/curing agent | | | | 10/1 | 10/1 | 10/1 | 10/1 |
| Evaluation | Rubber physical properties | Initial | Strength [Mpa] | 7.27 | 6.96 | 6.58 | 6.46 |
| | | | Elongation [%] | 470 | 350 | 300 | 310 |
| | | | Hardness JIS-A | 47 | 58 | 54 | 55 |
| | | After exposure to heat 90° C. × 2 W | Strength [Mpa] | 7.66 | 6.24 | 5.88 | 5.73 |
| | | | Elongation [%] | 420 | 300 | 240 | 210 |
| | | | Hardness JIS-A | 48 | 60 | 56 | 54 |

| | | | | EX5 | EX6 | EX7 |
|---|---|---|---|---|---|---|
| Main Agent | A | Urethane prepolymer | | 42.1 | 42.1 | 42.1 |
| | B | GX-5170 | cardanol 12EO | 0.1 | 1.0 | 10.0 |
| | | GX-5167 | cardanol 9EO | | | |
| | | GX-5166 | cardanol 7EO | | | |
| | | Isocyanurate | HDI nurate: D-170N | 2.0 | 2.0 | 2.0 |
| | | LITE 2020 | 1 EO | | | |
| | | Carbon black | # 200MP | 20.0 | 20.0 | 20.0 |
| | | Calcium carbonate | Super S | 18.6 | 18.6 | 18.6 |
| | | Plasticizer | DINP | 16.8 | 16.8 | 16.8 |
| | | Catalyst | DMDEE | 0.2 | 0.2 | 0.2 |
| | | Total | | 100.0 | 100.0 | 100.0 |
| Curing Agent | | Polyol 1 | EXCENOL 450ED | 47.9 | 47.9 | 47.9 |
| | | Polyol 2 | PREMINOL 7001K | 5.0 | 5.0 | 5.0 |
| | | Calcium carbonate | KALFAIN 200 | 46.8 | 46.8 | 46.8 |
| | | Catalyst | U-810 | 0.3 | 0.3 | 0.3 |
| | | Total | | 100.0 | 100.0 | 100.0 |
| Mixing ratio (mass ratio) Main agent/curing agent | | | | 10/1 | 10/1 | 10/1 |
| Evaluation | Rubber physical properties | Initial | Strength [Mpa] | 6.77 | 6.29 | 6.12 |
| | | | Elongation [%] | 310 | 450 | 500 |
| | | | Hardness JIS-A | 56 | 48 | 45 |
| | | After exposure to heat 90° C. × 2 W | Strength [Mpa] | 5.91 | 5.70 | 5.56 |
| | | | Elongation [%] | 240 | 410 | 460 |
| | | | Hardness JIS-A | 58 | 50 | 46 |

CE: Comparative Example
EX: Example

The respective components shown in Table 1 above are detailed below.

<Main Agent>

Urethane prepolymer: urethane prepolymer having an isocyanate group at its terminal obtained by mixing 70 parts by mass of polyoxypropylene diol (commercial name "SANNIX PP2000" manufactured by Sanyo Chemical Industries, Ltd., hydroxyl value 56, number average molecular weight 2,000), polyoxypropylene triol (commercial name "SANNIX GP3000" manufactured by Sanyo Chemical Industries, Ltd., hydroxyl value 56, number average molecular weight 3,000), and MDI (commercial name "Sumijour 44S" manufactured by Sumika Bayer Urethane Co., Ltd.) so as to have a NCO/OH ratio of 2.0, and allowing the mixture to react under the condition of temperature of 80° C. for 5 hours GX-5170: compound expressed by the foregoing Formula (1) (where R represents a hydrogen atom, and n represents 11) (corresponding to the compound (B) described above) (manufactured by Cardolite Corporation)

GX-5167: compound expressed by the foregoing Formula (1) (where R represents a hydrogen atom, and n represents 8) (corresponding to the compound (B) described above) (manufactured by Cardolite Corporation)

GX-5166: compound expressed by the foregoing Formula (1) (where R represents a hydrogen atom, and n represents 6) (corresponding to the compound (B) described above) (manufactured by Cardolite Corporation)

Isocyanurate: D-170N (HDI nurate manufactured by Mitsui Chemicals, Inc.)

LITE 2020: compound expressed by the foregoing Formula (1) (where R represents a hydrogen atom, and n represents 0) (not corresponding to the compound (B) described above since n in Formula (1) represents 0) (manufactured by Cardolite Corporation)

Carbon black: #200MP manufactured by Nippon Steel Carbon Co., Ltd. (HAF carbon black)

Calcium carbonate: Super S manufactured by Maruo Calcium Co., Ltd. (heavy calcium carbonate)

Plasticizer: DINP manufactured by J-PLUS Co., Ltd. (diisononyl phthalate)

Catalyst: UCAT-660M manufactured by San-Apro Ltd. (DMDEE (dimorpholinodiethyl ether))

<Curing Agent>

Polyol 1: Excenol 450ED manufactured by Asahi Glass CO., Ltd. (polyoxypropylene tetraol (ethylene oxide (EO)-terminated), hydroxyl value 450 mgKOH/g, number average molecular weight 500)

Polyol 2: PREMINOL 7001K manufactured by Asahi Glass CO., Ltd. (polyoxypropylene triol (ethylene oxide (EO)-terminated), hydroxyl value 28 mgKOH/g, number average molecular weight 6,500)

Calcium Carbonate: KALFAIN 200 manufactured by Maruo Calcium Co., Ltd. (calcium carbonate surface-treated with fatty acid)

Catalyst: U-810 manufactured by Nitto Kasei Co., Ltd. (dioctyltin dilaurate)

As can be seen from Table 1, the urethane adhesive compositions of Examples 1 to 7 containing the compound (B) exhibited excellent rubber physical properties (strength, elongation) both initially and after exposure to heat.

Comparison of Examples 2 to 4 (embodiments with only difference in the compound (B)) shows that Examples 2 to 3 where n in Formula (1) was not less than 8 exhibited more excellent rubber physical properties (strength, elongation, hardness) after exposure to heat. In particular, Example 2 where n in Formula (1) was not less than 10 exhibited yet more excellent rubber physical properties (strength, elongation, hardness) after exposure to heat.

In addition, comparison of Example 2 and Examples 5 to 7 (embodiments with only difference in the compound (B)) showed that Example 2 and Examples 5 to 6 where the compound (B) content was 0.01 to 20 mass % based on the urethane prepolymer (A) content exhibited more excellent rubber physical properties (strength, hardness) both initially and after exposure to heat. In particular, Examples 2 and 5 where the compound (B) content was 0.1 to 2.0 mass % based on the urethane prepolymer (A) content exhibited yet more excellent rubber physical properties (strength, hardness) both initially and after exposure to heat. Among those, Example 2 where the compound (B) content was 0.5 to 1.0 mass % based on the urethane prepolymer (A) content exhibited even more excellent rubber physical properties (strength, hardness) both initially and after exposure to heat.

Meanwhile, the urethane adhesive compositions of Comparative Examples 1 to 3 not containing the compound (B) all showed insufficient rubber physical properties for either strength or elongation both initially and after exposure to heat.

The invention claimed is:

1. A urethane adhesive composition comprising a urethane prepolymer (A) having an isocyanate group at its terminal, and a compound (B) represented by Formula (1) below, (1)

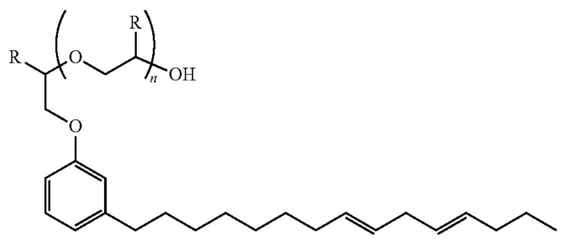

where R represents a hydrogen atom or an alkyl group, and n represents an integer of to 20, and wherein a content of the compound (B) is 0.1 to 1.0 mass % based on a total mass of the urethane adhesive composition.

2. The urethane adhesive composition according to claim 1, wherein the urethane prepolymer (A) is a urethane prepolymer obtained by mixing a polyether polyol with a number average molecular weight of 500 to 20,000 and an aromatic polyisocyanate such that a ratio of isocyanate groups in the aromatic polyisocyanate to one mole of hydroxyl groups in the polyether polyol is 1.5 to 2.5 moles and reacting them with each other.

3. The urethane adhesive composition according to claim 1, further comprising a carbon black or a calcium carbonate.

4. The urethane adhesive composition according to claim 1, further comprising a modified isocyanate.

5. The urethane adhesive composition according to claim 1, wherein the urethane adhesive composition is a two-part urethane adhesive composition.

6. The urethane adhesive composition according to claim 1, wherein n represents an integer of 8 to 18.

7. The urethane adhesive composition according to claim 1, wherein n represents an integer of 10 to 16.

8. The urethane adhesive composition according to claim 1, wherein R represents hydrogen.

9. The urethane adhesive composition according to claim 1, wherein R represents an alkyl group.

10. The urethane adhesive composition according to claim 9, wherein the alkyl group has 1 to 6 carbon atoms.

11. The urethane adhesive composition according to claim 9, wherein the alkyl group has 1 to 3 carbon atoms.

12. The urethane adhesive composition according to claim 9, wherein the alkyl group is a methyl group.

* * * * *